US006529799B1

(12) United States Patent
Paulk, Jr. et al.

(10) Patent No.: US 6,529,799 B1
(45) Date of Patent: Mar. 4, 2003

(54) SYSTEM FOR AFFIXING TAGS TO LUMBER

(75) Inventors: Winnes W. Paulk, Jr., Waynesboro, GA (US); J. Michael Wilson, Martinez, GA (US)

(73) Assignee: Innovative Systems & Designs, Inc., Augusta, GA (US)

( * ) Notice: Subject to any disclaimer, the term of this patent is extended or adjusted under 35 U.S.C. 154(b) by 308 days.

(21) Appl. No.: 09/590,327

(22) Filed: Jun. 8, 2000

Related U.S. Application Data

(60) Provisional application No. 60/138,380, filed on Jun. 9, 1999.

(51) Int. Cl.[7] .......................... G06F 7/00; G06F 11/00; B03B 1/00

(52) U.S. Cl. ....................... 700/227; 700/115; 700/124; 209/4.8

(58) Field of Search ................................ 700/115, 124, 700/227; 144/408, 358; 209/517

(56) References Cited

U.S. PATENT DOCUMENTS

| | | | | | |
|---|---|---|---|---|---|
| 3,476,302 | A | | 11/1969 | Hurd | |
| 4,324,519 | A | | 4/1982 | Moore | |
| 4,386,994 | A | * | 6/1983 | Fujii et al. | 156/360 |
| 4,392,204 | A | | 7/1983 | Prim et al. | |
| 4,894,262 | A | * | 1/1990 | Heitmanek | 118/314 |
| 5,014,896 | A | | 5/1991 | Reitmeier et al. | |
| 5,208,962 | A | | 5/1993 | Walker, Jr. | |
| 5,292,048 | A | | 3/1994 | Vanderwiel | |
| 5,307,294 | A | | 4/1994 | Aman et al. | |
| 5,674,335 | A | | 10/1997 | Aman et al. | |
| 5,775,397 | A | | 7/1998 | Lippincott | |
| 6,174,036 | B1 | * | 1/2001 | Aman et al. | 347/2 |
| 6,273,170 | B1 | * | 8/2001 | Finn et al. | 156/541 |

* cited by examiner

*Primary Examiner*—Leo Picard
*Assistant Examiner*—Elliot L Frank
(74) *Attorney, Agent, or Firm*—Maria Reichmanis

(57) ABSTRACT

An automated apparatus for tagging individual boards in a pack of lumber. The apparatus includes a support frame with a jump chain conveyer, a lift, a back stop or bump plate, a labeling assembly including a printer and a stapler, an optical, ultrasonic, or RF detector for determining the position of a leading board within the pack, a positioning assembly for moving the labeling assembly in three dimensions via stepper motors, servo motors, or hydraulic cylinders, a computer, and a bidirectional communications link connecting the detector, the labeling assembly, and the positioning assembly to the computer. In operation, a pack of lumber is placed onto the conveyer, lifted, and conveyed by the moving chains to abut the back stop where it is lowered onto the support frame. The operator inputs the number of courses in the pack, the dimensions of the boards, the size of the pack, and other selected identifying indicia into the computer. Under computer control, the detector locates the position of the leading board. Then, starting with the leading board, the positioning assembly automatically moves the labeling assembly to each board in turn to print and affix a label.

23 Claims, 4 Drawing Sheets

Fig 1B
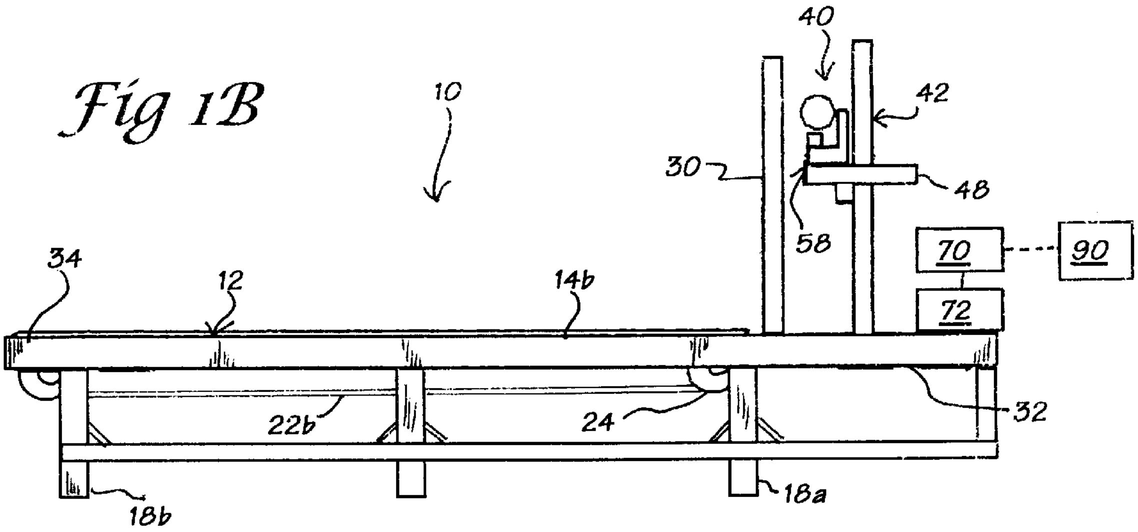
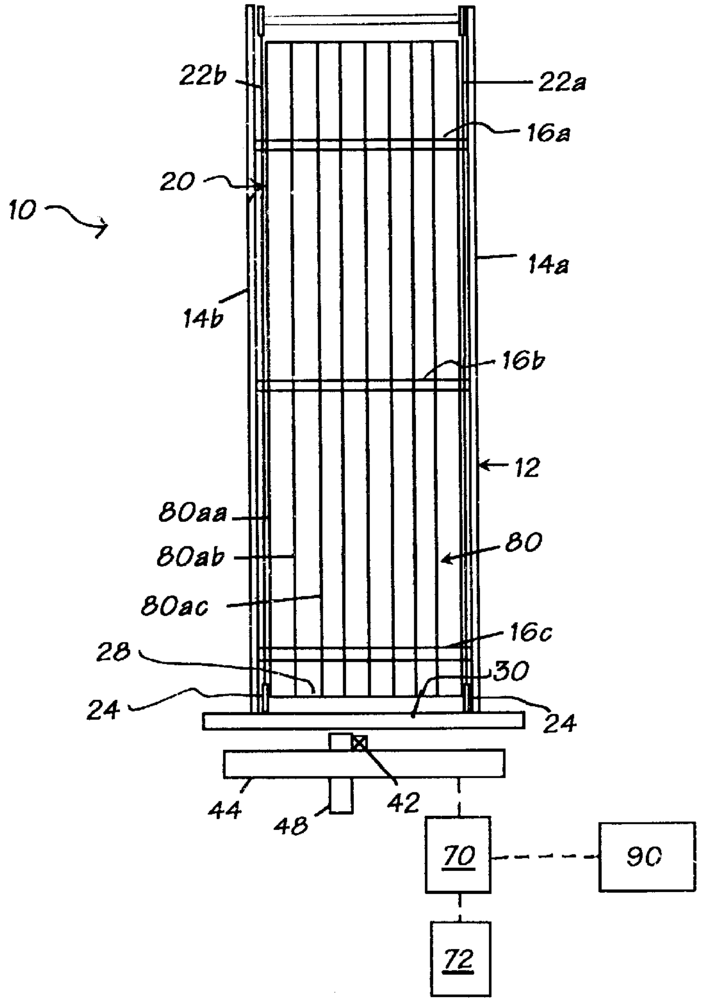
Fig 2

SYSTEM FOR AFFIXING TAGS TO LUMBER

This application claims the benefit of Provisional application No. 60/138,380 filed, Jun. 9, 1999.

BACKGROUND OF THE INVENTION

1. Field of the Invention

The present invention relates to a system for tagging lumber. In particular, the present invention relates to a system that includes an automated apparatus and method for affixing labels ("tags") that carry identifying indicia onto the ends of individual boards in a pack of lumber.

2. Discussion of Background

Lumber is usually labeled ("tagged") to identify the manufacturer, the species of wood or the type of product, the grade, and various other data useful to consumers (wholesalers and retailers, homeowners, handymen, carpenters, builders, etc.). Identifying labels are sometimes applied by the manufacturer, for example, by stamping individual boards with an inked design, by embossing, or by attaching a paper or plastic tag to the boards. However, most lumber is not sold directly to the end user. Rather, it is bundled and shipped from a primary manufacturer (such as a sawmill) to a secondary manufacturer (a kiln or surfacing yard), then to a wholesaler, and finally to a retailer. At each stage in this process, the lumber may be unpacked, graded (or regraded), sorted (by size, grade, and composition), and repacked. The bundled units ("packs" or "stacks") that are ultimately shipped to a retail outlet may each contain boards of the same or different length, width, grade, and composition. Each pack in a shipment may differ from the others; each layer ("course") of a pack may differ from the other layers. Even in shipments of woods such as Southern Yellow Pine ("SYP") where the packs tend to be quite similar, the dimensions of boards in different layers of a pack may vary.

With the growing popularity of bar code scanners at retail checkout counters, many wholesalers and retail distribution centers label each board individually with a label that can be read by these types of scanners. Labels can be applied by hand, for example, with devices such as those disclosed by Vanderwiel (U.S. Pat. No. 5,292,048), Reitmeier, et al. (U.S. Pat. No. 5,014,896), and Hurd (U.S. Pat. No. 3,476,302). Vanderwiel's semiautomatic lumber tag stapler includes a conventional pneumatic staple gun, a holder for a roll of tags, a rotatable pivot indexing arm that moves a tag into position for stapling, a cylinder for rotating the indexing arm, and an index stop pin for limiting pivoting of the arm.

Reitmeier, et al. disclose a trigger-operated pneumatic staple gun which both staples and cuts labels. This device includes a guide which directs the labels through a cutter and underneath the staple gun head, and a pair of pneumatic cylinders with a common spool valve. One of the cylinders is connected to a label advance head which brings labels into position; the other is connected to a cutter which cuts the just-stapled label from the remainder of the roll.

Hurd's portable stapler is used for attaching wallboard to a supporting framework. The device includes an attachment with a reel of wire, a slidable shoe, and a staple guide that, when mounted to a conventional stapler, acts as a mechanism for regulating the driving force and thereby minimizing damage to the wallboard.

No matter what hand tool is selected, hand-labeling lumber is slow, labor-intensive, and expensive, and has a high potential for error due to the variability of the boards in atypical wholesaler's or retailer's pack. Individual boards are difficult to distinguish from other boards of similar species, grade, thickness, width, and length.

Automated and semi-automated apparatus for tagging lumber is also available. In U.S. Pat. No. 5,775,497, Lippincott discloses a lumber stamper for embossing the ends of a plurality of stacked pieces. The apparatus includes an embossing plate, a press plate with a plurality of movable segments, a lumber support for holding stacked, parallel lumber pieces between the plates, a drive mechanism for moving the press plate segments between their retracted and extended positions so as to emboss the ends of a clamped stack of lumber, and a controller. The embossing and press plates are mounted on movable carriers, allowing the operator to adjust the distance between these plates to accommodate lumber of different lengths.

Aman, et al. (U.S. Pat. No. 5,307,294) use a focused beam or a movable scanner which collects topological information about a stack of lumber, with a processor which translates this information into the "tally count" or "end tally," defined as the number of pieces of lumber with each particular combination of width, thickness, and length. This information can be used to determine the exact location of individual boards within as tack, generating unique labels for each board, and applying the labels (U.S. Pat. No. 5,674,335).

Walker, Jr.'s automated tagging apparatus (U.S. Pat. No. 5,208,962) is used for stapling tags to the ends of individual boards passing along a conveyor belt. The apparatus includes a conveyer operating at approximately one foot/second, a labeling system with a roll of tags and a conventional stapler, a sensor that activates the labeling system when a board passes over the sensor, and a roller that lifts the boards to release the sensor. Before reaching the sensor, the boards are fed through a chute that aligns the ends.

Prim, et al. (U.S. Pat. No. 4,392,204) provide a computer-controlled umber marking system that includes a trimming system with a chain/lug conveyer, a pulse generator that produces a pulse for each increment of conveyor movement, a console where an operator views the boards and inputs grade data, a "curtain" of optical detectors which determine the maximum available length of each board, and a second set of optical detectors that determine the width of each board based on the number of pulses during the period that a light beam is broken by each board. This grade, length, and width data is collated and output to an embossing mechanism that marks the ends of the boards on a piece-by-piece basis.

Moore's wood handling machine (U.S. Pat. No. 4,324,519) includes a rectangular support bed that holds a stack of precut boards in layers, a wheeled carriage that holds a vertical support frame and a hydraulic piston-and-cylinder assembly, a pneumatic clamping device to clamp the stack and hold it in alignment, a pushing device for pushing one layer at a time of the stacked boards in order to expose the surface of the next layer for marking, and a stop bar to prevent movement of the next adjacent layer of boards during operation of the pushing device. The operation of the apparatus is described in the paragraph starting on line 51, Col. 5 (note that the apparatus is manually controlled).

While automated or semi-automated tagging apparatus is faster than hand-labeling, some presently available apparatus requires that the individual boards be placed onto a conveyer and moved past a stapler, embosser, or other marking device. Other such apparatus requires a determination of the number of boards in a pack (and the dimensions of the individual boards) before the tags can be applied. There remains a need for a simple, rugged, cost-effective system for tagging the ends of boards in a pack.

SUMMARY OF THE INVENTION

According to its major aspects and broadly stated, the present invention is an automated apparatus and method for labeling ("tagging") individual boards in a pack of lumber. The apparatus includes a support frame, a jump chain conveyor, a lift, a back stop or bump plate, a detector for determining the position of a leading board within the pack, a labeling assembly, a positioning assembly for moving the labeling assembly in three dimensions, and a computer system with a PLC (i.e., programmable logic controller) and an HMI (i.e., a human-machine interface such as a keyboard, keypad, touchpad or touch screen, voice input, or other suitable interface).

In operation, a pack of lumber is placed onto the jump chains, lifted, and conveyed by the moving chains until it abuts the back stop, where it is lowered onto the support frame. The operator inputs identifying information about the pack into the computer, for example, the dimensions of the boards, the size of the pack (typically a full, ½, or ¼ pack, although other sizes may also be useful), the grade, composition, and, optionally, customer information such as the customer's name, brand name or logo. The computer system uses this information to compute the number of labels needed, the approximate distance between the centers of the boards in each course, and the approximate distance between the centers of neighboring boards in adjacent courses.

Under computer control, the detector automatically locates the position of the first, leading board in the pack; then, starting with the leading board, the positioning assembly automatically moves the labeling assembly to each board in turn to print and affix a label. (For stand-alone operation, packs of lumber are simply loaded onto the support frame by a forklift or other suitable lifting apparatus, tagged, and removed.) The labels may be placed approximately at the centers of the boards, or at some other convenient location. The apparatus is capable of attaching identifying labels ("tags") to the individual boards in a pack with minimal intervention by a human operator, with increased accuracy and increased speed over manual tagging.

An important feature of the present invention is the positioning assembly, which is movable in three dimensions via servo or stepper motors, pneumatic (air or other gas) or hydraulic cylinders, or other suitable devices. For example, the positioning assembly may include three servo motors for moving the labeling assembly in three orthogonal directions (X, Y, and Z) for precise, three-dimensional positioning and accurate tagging. Alternatively, two servo motors move the labeling assembly in two orthogonal directions (such as the X and Y directions), while an air cylinder moves it in the Z direction. The positioning assembly also operates in conjunction with the detector to precisely locate the position of the leading board, and to deter accidental "slamming" of the labeling assembly into the pack.

Another important feature of the present invention is the computer system which controls the operation of the apparatus. The computer system can be user-programmable; alternatively, dedicated systems may also be useful. Solely by inputting the dimensions of the boards in the pack into the computer system, the operator is able to program the computer system to remotely control the apparatus to affix labels to each board in turn, starting with a selected leading board (typically, the leading board is located at one of the four corners of the pack). If desired, the operator can input additional information about the pack to be printed on the labels, including but not necessarily limited to the species of wood (pine, birch, oak, etc.), the type of wood product (natural wood, fiberboard, chipboard, compositions such as Masonite™, etc.), the grade, the customer's name, the customer's logo, price, bar code, etc. Labels can be pre-printed with some or all of the desired information; alternatively, the information can be printed "on the fly" during labeling operations. Programming the computer to print all identifying information in real time, during the labeling process, eliminates the need to change out rolls of tags after processing each pack or order.

Another feature of the present invention is the detector, which is preferably mounted to the Z-axis carriage of the positioning assembly (other locations may also be useful). The detector includes an optical, radiofrequency ("RF"), or ultrasonic sensor for determining the position of a leading board within the pack. Once the position of the leading board is known, the computer automatically operates the positioning assembly to move the labeling assembly to the leading board, then to each of the remaining boards in turn.

Still another feature of the present invention is the computer-controlled labeling assembly, which is mounted to the positioning assembly for three-dimensional movement. The labeling assembly includes a printer for generating labels, and a stapler, glue gun, or other suitable device for affixing the labels to the boards.

Yet another feature of the present invention is the support frame with the conveyor and back stop. The conveyor is preferably a jump chain conveyor or chain-lug conveyor of the type familiar to those skilled in the art, with at least two parallel, endless chains moving in a path defined by an elongated loop with upper and lower runs. In this type of conveyor, each chain wraps around a drive sprocket. The drive sprockets are mounted on a common drive shaft, which is rotated by a motor operably connected to the shaft. The chains lift and move a pack of lumber until it abuts the back stop, where the pack is lowered onto the support frame to be tagged. The back stop ensures that the ends which are to be tagged are approximately aligned in a vertical plane.

Still another feature of the present invention is the mode of operation of the apparatus, which can operate in-line or in stand-alone mode as described above. Given the identifying information provided by the operator, the detector automatically determines the position of the leading board; the computer system controls movement of the positioning assembly and tags of every board in the pack without the need for other human intervention. This makes for rapid, cost-effective labeling, since there is no need to precisely specify the positions of the individual boards in the pack before starting labeling operations.

Other features and advantages of the present invention will be apparent to those skilled in the art from a careful reading of the Detailed Description of Preferred Embodiments presented below and accompanied by the drawings.

BRIEF DESCRIPTION OF THE DRAWINGS

In the drawings,

FIG. 1B is a side view of the apparatus of FIG. 1A without a pack, showing the relative position of the labeling assembly with respect to the support frame and the back stop of the apparatus;

FIG. 2 is a top view of the apparatus of FIG. 1A;

DETAILED DESCRIPTION OF PREFERRED EMBODIMENTS

Figure 1A:
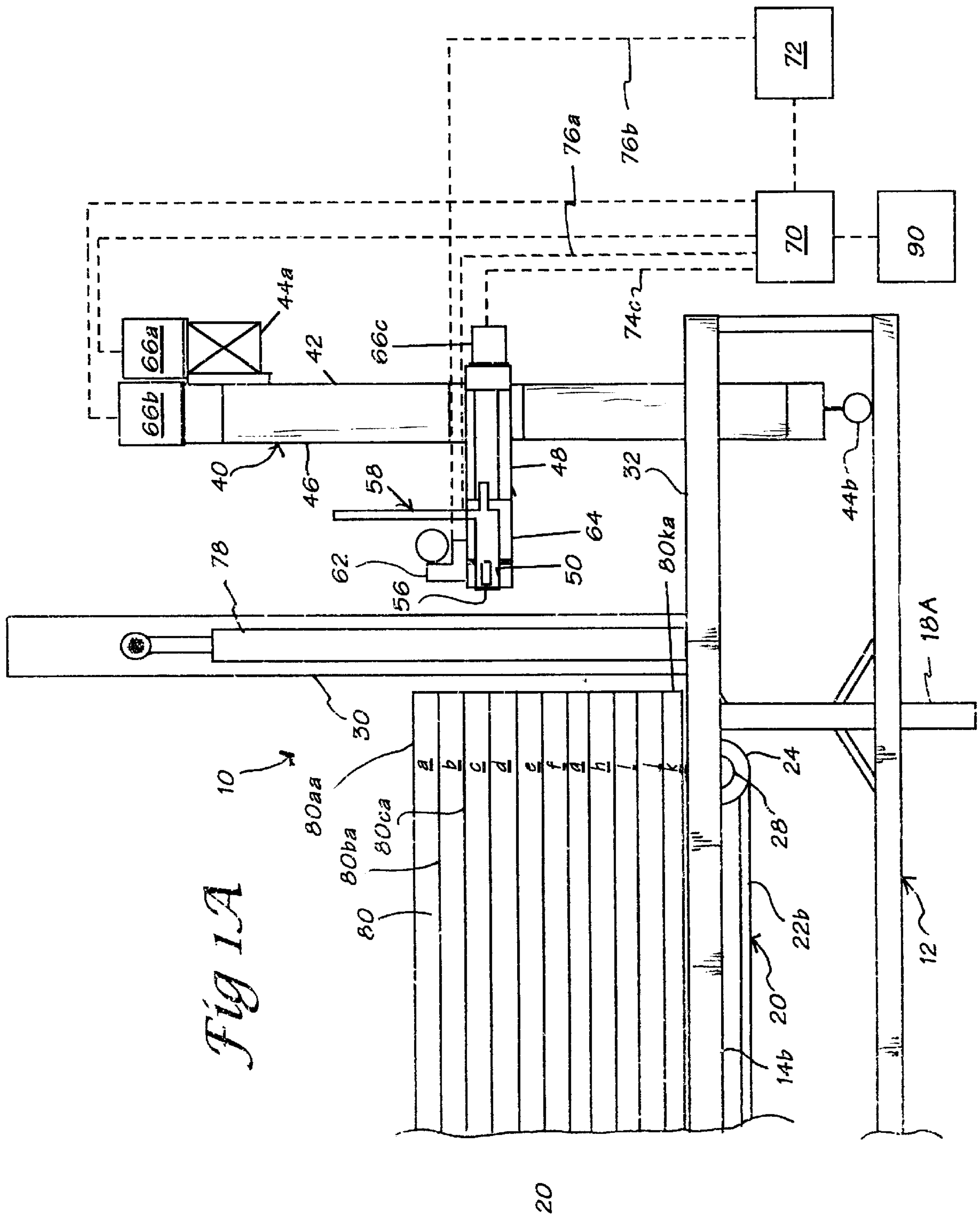
FIG. 1A is a side, detail view of a lumber tagging apparatus according to a preferred embodiment of the present invention loaded with a pack, showing the relative positions of the labeling assembly, the back stop, the XYZ positioning assembly, and the computer system.

In the following detailed description of the invention, reference numerals are used to identify structural elements, portions of elements, surfaces or areas in the drawings, as such elements, portions, surfaces or areas may be farther described or explained by the entire written specification. For consistency, whenever the same numeral is used in different drawings, it indicates the same element, portion, surface or area as when first used. Unless otherwise indicated, the drawings are intended to be read together with the specification, and are to be considered a portion of the entire written description of this invention as required by 35 U.S.C. §112. As used herein, the terms "horizontal," "vertical," "left," right," "up," "down," as well as adjectival and adverbial derivatives thereof, refer to the relative orientation of the illustrated structure as the particular drawing figure faces the reader.

Figure 3:
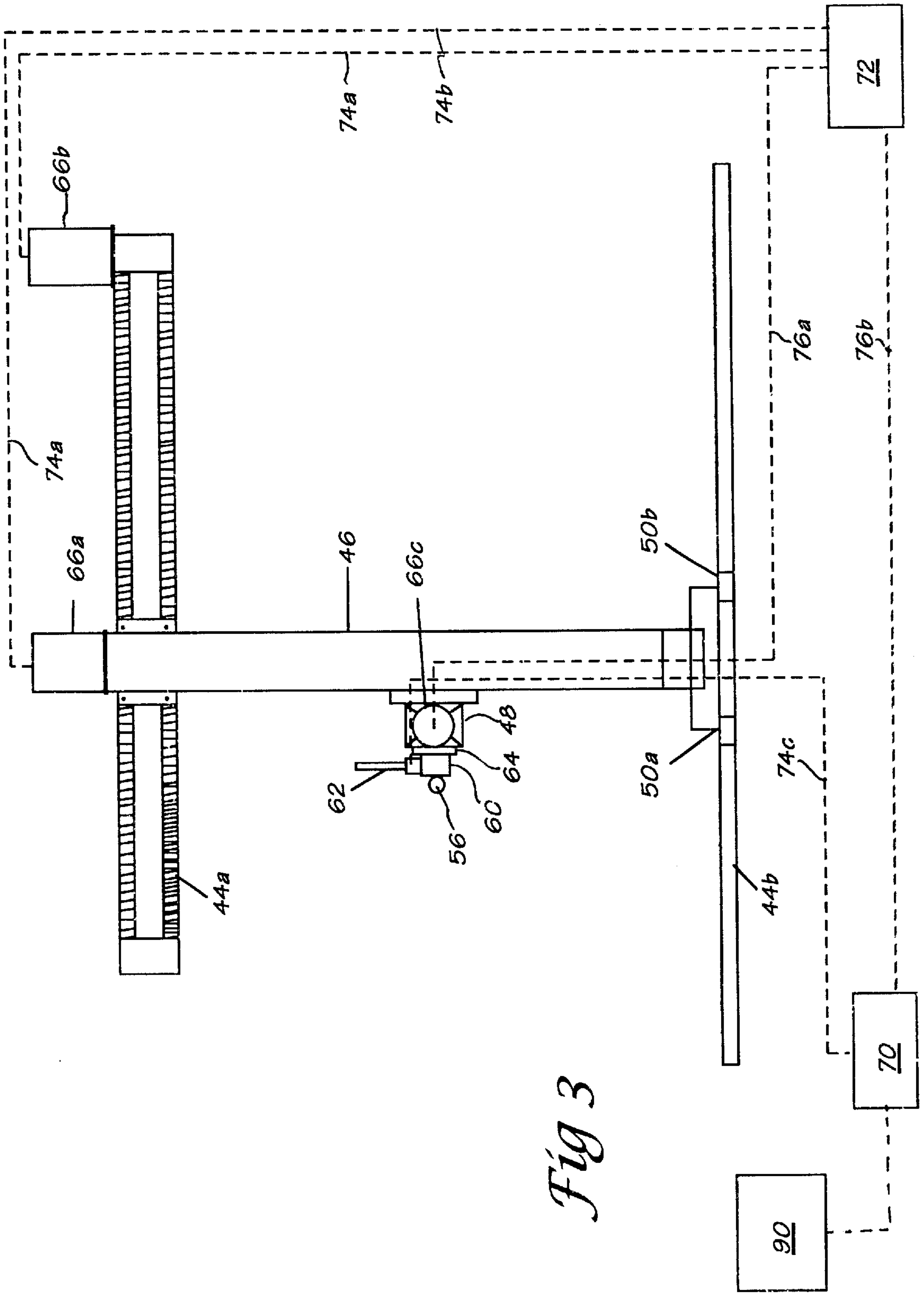
FIG. 3 is an end view of the apparatus of FIG. 1A.

Referring now to FIGS. 1–3, there is shown an "endtagger" or lumber tagging apparatus 10 according to a preferred embodiment of the present invention. Apparatus 10 includes a support frame 12 with two parallel, longitudinal members 14*a*, 14*b*, a plurality of transverse members 16*a*, 16*b*, 16*c*, corner supports 18*a*, 18*b*, and a conveyor 20.

Support frame 12 is configured to hold a pack of lumber, that is, a plurality of elongated boards of approximately the same length that are stacked in a parallel, adjacent configuration.

Conveyor 20 is a jump chain conveyor, a chain-lug conveyor, or other suitable type of conveyor known to those skilled in the art. Conveyor 20 has at least two parallel, endless chains 22*a*, 22*b*, each chain moving in a path defined by an elongated loop with upper and lower runs. In this type of conveyor, the loop at one end of each chain 22 wraps around a drive sprocket 24; the other end wraps around a roller 26. The individual drive sprockets 24 are mounted on a common drive shaft 28 which is rotated by a motor (not shown) operably connected to the shaft. (For clarity, the various components of apparatus 10 are shown schematically in FIGS. 1–3.)

A back stop or bump plate 30, of any convenient height, is mounted transverse to members 14*a*, 14*b* near a first end 32 of frame 12. Chains 22*a*, 22*b* are positioned generally as indicated in FIGS. 1A and 2. Chains 22*a*, 22*b* lift and move a pack of lumber (such as a pack 80) until it abuts back stop 30, where the pack is lowered onto support frame 12 to be tagged. Back stop 30 is generally planar; thus, the back stop serves to even the ends of the boards in the pack and to straighten the pack on conveyor 20. Back stop 30 may be fixed in position; alternatively, the back stop may be movable in a horizontal direction (i.e., parallel to longitudinal members 14*a*, 14*b*).

A positioning assembly 40 is mounted to frame 12 at first end 32. Assembly 40 includes an XYZ-axis positioning device 42 with transverse arms 44*a*, 44*b*, a vertical arm 46, a horizontal arm 48, and a plurality of linear bearings such as 50*a*, 50*b* (if preferred, a single bearing may be used instead).

A labeling assembly 58 includes a printer 60 and a stapler 62 secured to a carriage 64, which in turn is secured to horizontal arm 48. Printer 60 may be any useful type of printer, for example, a thermal printer that uses standard paper rolls. Labeling assembly 58 may include a 90° rotary actuator, an air gun, or other suitable device (not shown) that transfers printed labels from printer 60 to the board which is to be labeled.

A detector 56 includes a sensor that senses the position of the detector (and therefore, the position of assembly 58) with respect to the ends of boards placed on frame 12 (as will be described further below). Detector 56 includes an optical, radiofrequency (RF), or ultrasonic sensor that emits a focussed beam of energy and receives a reflection of that beam, from which positional data can be computed by techniques known in the art.

Servo or stepper motors 66*a*, 66*b*, 66*c* allow for positioning of assembly 58 in three dimensions: motor 66*a* controls the X-axis position of assembly 58, that is, the position of vertical arm 64 along transverse arms 44*a*, 44*b*; motor 66*b* controls the Y-axis position of assembly 58 along vertical arm 64; motor 66*c* controls the Z-axis position of assembly 58. In this way, assembly 58 can be operated to traverse the entire vertical-horizontal plane which is approximately parallel to the end surface of apparatus 10.

Motors 66*a*, 66*b*, 66*c* are operably connected to a PLC (programmable logic controller) or programmable computer 70 and a bidirectional communications link 72 by cables 74*a*, 74*b*, 74*c* and 76*b*, 76*c*, connected generally as indicated in FIGS. 1A and 3. One or more hydraulic or pneumatic cylinders 78 raise and lower back stop 30 with respect to support frame 12. Additional stepper or servo motors (or hydraulic or pneumatic cylinders) may be provided to adjust the horizontal position of back stop 30. Detector 56 and labeling assembly 58 are operably connected to PLC 70 either directly or via communications link 72.

If desired, any or all of motors 66*a*, 66*b*, 66*c* may be replaced by pneumatic or hydraulic cylinders or other suitable positioning devices. For example, positioning assembly 58 may include two servo or stepper motors for movement in the X and Y directions, and a pneumatic cylinder for movement in the Z direction. Other combinations of mechanical and pneumatic (or hydraulic) positioning devices may also be useful.

In operation, a pack of lumber 80 is placed onto conveyor 20, lifted, and conveyed to back stop 30 where it is lowered onto support frame 12. Pack 80 contains a plurality of individual boards $\mathbf{80}_{aa}$, $\mathbf{80}_{ab}$, . . . , $\mathbf{80}_{ba}$, $\mathbf{80}_{bb}$, . . . arranged in generally horizontal rows or courses a, b, . . . , k. The number of courses, and the number of boards in each course, will of course vary depending on the size of the order to be processed, the size of the individual boards, and so forth.

In a preferred mode of operation of apparatus 10, the operator inputs information about pack 80 into PLC or computer 70 via a control unit 90 that includes a keyboard, selector switches, touch screen monitor, keypad or touch pad, light pen, voice input, or indeed any other convenient input technology. Such information may include, but not necessarily be limited to, the dimensions of the boards in pack 80 (length, width, height), the grade of lumber, the size of the pack (full, ½, ¼, etc.), the type of wood or wood product (pine, walnut, birch, oak, plywood, fiberboard, Masonite®, etc.), a UPC or other scannable bar code, the price, the customer's name, the customer's brand name or logo, and so forth. Control unit 90 may include on/off controls, indicator lights, and other tactile, visible, or audible outputs that provide the operator with information about the status and operation of apparatus 10.

PLC 70 uses the operator-provided information to compute the number of labels needed, the approximate distance between the centers of the boards in each course, and the approximate distance between the centers of neighboring boards in adjacent courses. The computed data is used to operate apparatus 10 as described below. Alternatively, PLC may be programmed to compute the distance between the leading edges of two neighboring boards.

Labeling assembly 58 may use pre-printed tags with the customer's name and/or logo; alternatively, this information may be input by the operator and printed on each label. Apparatus 10, as described herein, can be used with any standard or custom size pack 80, including fractional (¼, ½, ¾, etc.) packs and packs dimensioned in metric units or standard inches.

Back stop 30 is raised via cylinder 78, and the operator initializes assembly 58 via PLC to locate a leading board (such as a comer board $\mathbf{80}_{ka}$, indicated in FIG. 1A). The first, or leading board in a pack is typically selected to be one of the corner boards; however, PLC 70 can be programmed to operate with any board in pack 80 as a designated "leading board." PLC 70 determines the position of the leading board with respect to positioning assembly 40 using data from detector 56, this information also helps deter slamming of any portion of apparatus 10 into pack 80 during operation. PLC 70 then moves positioning assembly 40 into a position proximate the leading board, and activates labeling assembly 58 which proceeds to print, cut, and staple a custom label ("tag") to the leading board. If desired, assembly 58 may use other types of marking devices than above-described printer 60. For example, spray-painted labels, laser-embossed labels, and other types of labels are usable with apparatus 10.

Figure 4:
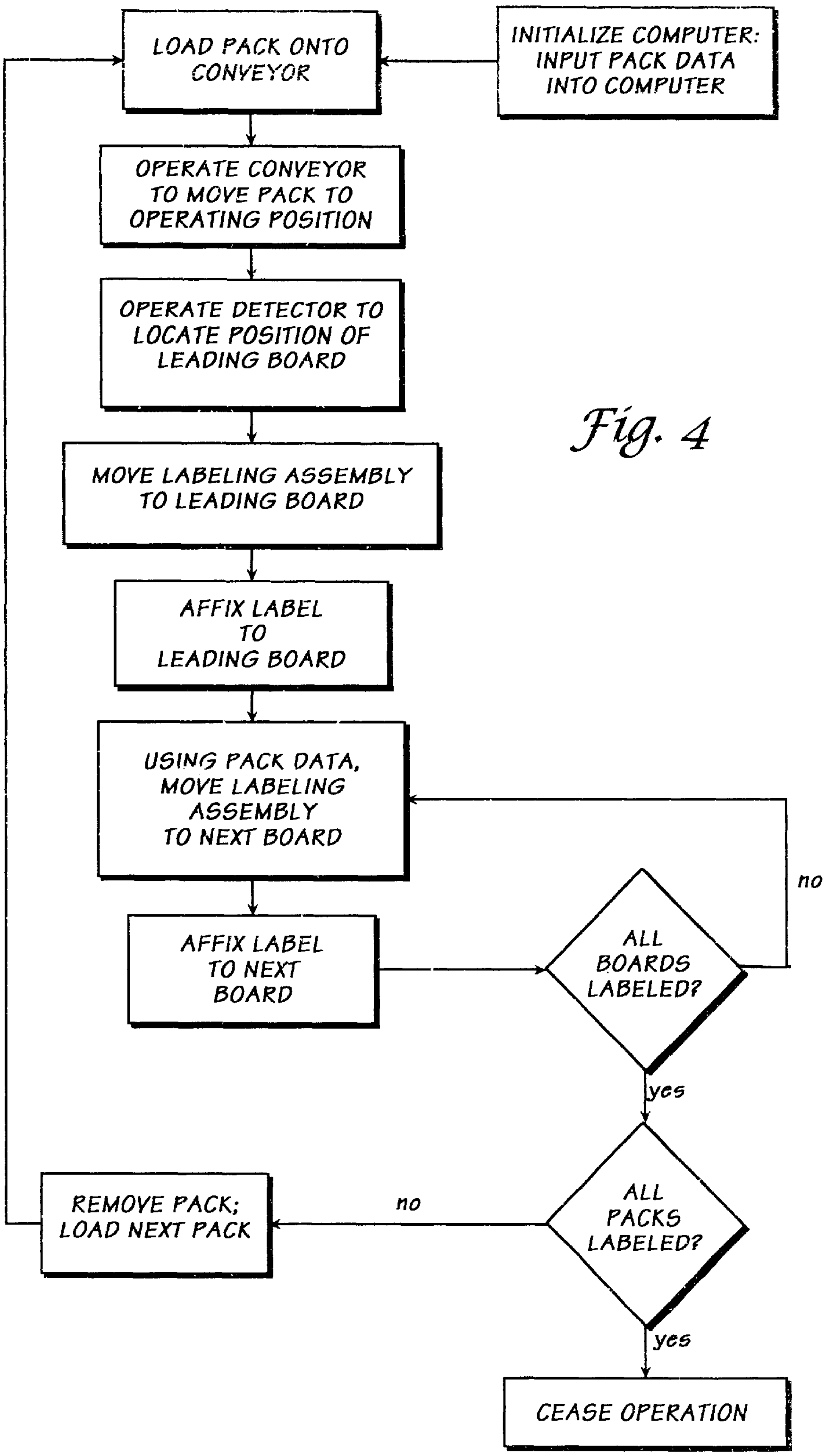
FIG. 4 is a flow chart illustrating the operation of the apparatus of FIG. 1A for tagging lumber.

PLC 70 then operates motors 66*a*, 66*b*, 66*c* to control the XYZ positioning of labeling assembly 58 to similarly tag each of the other boards in pack 80, as indicated schematically in FIG. 4. Assembly 58 may be moved horizontally along lower-most course k, labeling each board $\mathbf{80}_{ka}$, $\mathbf{80}_{kb}$, . . . in sequence, then raised to a next lower-most course j, and so forth, until all the boards in pack 80 have been tagged row by row. Alternatively, assembly 58 may be moved vertically to label boards $\mathbf{80}_{ka}$, $\mathbf{80}_{ja}$, . . . in a column k, and continuing to label the boards sequentially, column by column. Additional modes of operation of assembly 58 may also be useful.

Alternatively, PLC 70 may be programmed to label individual boards 80 row by row or (column by column), moving labeling assembly 58 to a next board until the end of a row (or column) has been reached, as computed from the operator-provided data. Then, PLC 70 moves labeling assembly 58 vertically to the next row, or horizontally to the next column, to continue operations.

To label each board 80 in sequence, PLC 70 affixes a label to the leading board, then moves labeling assembly 58 by a distance computed from the data input by the operator. To label boards 80 row by row, PLC 70 moves labeling assembly 58 sideways (i.e., horizontally) by a distance approximately equal to the width of the boards. To move to another row, PLC 70 moves assembly 58 vertically by a distance that depends on the height of boards 80.

In one embodiment of the invention, PLC 70 is programmed to move labeling assembly 58 so as to affix a label approximately at the center of each board 80. Alternatively, the label may be affixed at a selected corner of the board, or indeed at any convenient location on the face of the board.

The components of apparatus 10 may be made of any sturdy, durable materials. By way of example, frame 12 is preferably made of metal. Conveyor 20, printer 60, stapler 62, PLC or computer 70, and communications link 72 may be any of a variety of such devices as are readily available and suitable for the operation of the invention.

A tagging apparatus according to the present invention is capable of attaching identifying labels to each board within a pack 80 of lumber with minimal intervention by a human operator, with increased accuracy and increased speed over manual tagging. In a preferred mode of operation, the operator inputs data about the pack into PLC 70, and apparatus 10 proceeds to robotically attach a label to each board $\mathbf{80}_{aa}$, . . . in succession.

Apparatus 10 allows the operator to affix unique identifying labels for each pack 80, that is, the labels can be customized with the customer's name, address, logo, and so forth. In addition, the labels can include a UPC (i.e., universal product code) or other scannable code that contains this information (and, if desired, other information useful to the customer such as price, grade of lumber, etc.). Tedious hand-labeling and preprinted labels are not needed.

Apparatus 10 is rugged and simple to operate. Rather than stapling tags by hand or scanning the entire end face of a pack of lumber before starting to affix tags to the individual boards, a single sensor (sensor 56) locates the leading edge of one of the boards in the pack. This mode of operation is simple and rapid, and allows the use of more cost-effective computer equipment as well as more robust, user-friendly software. Additional data such as the dimensions of the boards in the pack are input manually.

With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the preferred embodiment herein described without departing from the spirit and scope of the present invention as defined by the appended claims.

What is claimed is:

1. An apparatus for affixing labels to boards within a pack of lumber, said apparatus comprising:

- a computer system;
- means for inputting identifying information about said pack by an operator to said computer system, said information including a size of said pack and dimensions of boards in said pack, said computer system processing said identifying information to generate labels;
- means for detecting a position of a leading board within said pack;
- labeling means for printing a label and applying said label to a board;
- positioning means for moving said labeling means to a position proximate said leading board, said detecting means, said labeling means, and said positioning means responsive to said computer system for detecting said position, moving said labeling means to said proximate position, and automatically applying said label to said leading board.

2. The apparatus as recited in claim 1, further comprising bidirectional communications means operably connecting said detector, said labeling means, and said positioning means to said computer system.

3. The apparatus as recited in claim 1, wherein said positioning means is responsive to said computer system for moving said labeling means to a next board within said pack, said labeling means applying a next label to said next board.

4. The apparatus as recited in claim 1, wherein said dimensions include a width and a height, and wherein said detecting means further comprises means for determining a position of a first board within said pack.

5. The apparatus as recited in claim 1, further comprising:

support means for supporting said pack; and means for moving said pack into a preferred position on said support means with respect to said detecting means and said labeling means.

6. The apparatus as recited in claim 1, further comprising:

a support frame for supporting said pack; and a conveyor assembly for moving said pack into a preferred position on said support frame with respect to said detecting means and said labeling means.

7. The apparatus as recited in claim 1, wherein said labeling means further comprises:

a printer; and a stapler operably connected to said printer.

8. The apparatus as recited in claim 1, wherein said positioning means further comprises:

means for moving said labeling means in an X direction;

means for moving said labeling means in a Y direction orthogonal to said X direction; and means for moving said labeling means in a Z direction orthogonal to said X direction and said Y direction.

9. A method for automatically affixing labels to boards within a pack of lumber, said method comprising the steps of:

inputting identifying information about said boards in said pack to a computer system by an operator, said information including a size of said pack and dimensions of boards in said pack, said computer system using said information to generate labels for said boards; and under control of said computer system, remotely detecting a position of a leading board within said pack, moving a labeling device to a position proximate said leading board, and operating said labeling device to print a label and apply said label to said leading board.

10. The method as recited in claim 9, further comprising the next steps of:

automatically moving said labeling device to a position proximate a next board in said pack; and operating said labeling device to print a label and apply said label to said next board.

11. The method as recited in claim 9, further comprising the next steps of:

for each remaining board in said pack, automatically moving said labeling device to a position proximate a next board; and operating said labeling device to print a label and apply said label to said next board.

12. The method as recited in claim 9, wherein said detecting step further comprises determining an (X, Y, Z) position of said leading board.

13. The method as recited in claim 9, wherein said dimensions include a width and a depth of said boards.

14. An apparatus for affixing labels to boards within a pack of lumber, said apparatus comprising:

a computer system;

input means for inputting identifying information about said pack to said computer system by an operator, said information including a size of said pack and dimensions of boards in said pack, said computer system processing said information to generate labels;

a positioning assembly;

a detector carried by said positioning assembly said detector adapted for determining a position of a leading board within said pack, said detector operated by said computer system;

a labeling assembly carried by said positioning assembly, said labeling assembly including means for printing a label and means for applying said printed label to a board; and at least one bidirectional communications link connecting said detector, said labeling assembly, and said positioning assembly to said bidirectional communications link so that said computer system can automatically operate said detector, said labeling assembly, and said positioning assembly to detect said position of said leading board, move said labeling assembly to a position near said leading board, and print and apply said label to said leading board, respectively.

15. The apparatus as recited in claim 14, further comprising a support frame for supporting said pack in an operating position near said positioning assembly.

16. The apparatus as recited in claim 14, wherein said positioning assembly is responsive to said computer system for moving said labeling assembly to a next board within said pack, said computer system operating said labeling assembly to generate a next label and apply said next label to said next board.

17. The apparatus as recited in claim 14, wherein said input means is a keyboard, keypad, touchpad, touch screen, or voice link.

18. The apparatus as recited in claim 14, further comprising:

a support frame for supporting said pack in an operating position near said positioning assembly; and conveyor means for moving said pack into a preferred position on said support frame with respect to said positioning assembly and said labeling assembly.

19. The apparatus as recited in claim 14, wherein said labeling assembly further comprises:

a printer; and a stapler operably connected to said printer.

20. The apparatus as recited in claim 14, wherein said positioning assembly further comprises:

means for moving said labeling assembly in an X direction;

means for moving said labeling assembly in a Y direction orthogonal to said X direction; and means for moving said labeling assembly in a Z direction, said Z direction being orthogonal to said X direction and said Y direction.

21. The apparatus as recited in claim 1, wherein said computer system further comprises a programmable logic controller.

22. The method as recited in claim 9, wherein said inputting step further comprises inputting said identifying information to a computer system having a programmable logic controller.

23. The apparatus as recited in claim 14, wherein said computer system further comprises a programmable logic controller.

* * * * *